Patented Sept. 17, 1940

2,215,219

UNITED STATES PATENT OFFICE 2,215,219

PREPARATION OF GLYCOL ACRYLATES

Elmer H. Haux, Tarentum, Pa., assignor to Pittsburgh Plate Glass Company, Allegheny County, Pa., a corporation of Pennsylvania No Drawing. Application July 24, 1935,
Serial No. 32,903

1 Claim. (Cl. 260—83)

The present invention relates to the preparation of acrylic acid ester resins which are suitable for use in the manufacture of laminated articles. More particularly it relates to the preparation of the mono and diglycol esters of acrylic acid which may be used with excellent results as reinforcing material in the preparation of safety glass.

The aliphatic esters of acrylic acid provide, on polymerization, resinous materials which have been utilized in the manufacture of laminated glass. British Patents Nos. 355,712 and 304,681 disclose the preparation of such resins. The known aliphatic ester resins of acrylic acid, however, have a low softening point which feature is objectionable and obviates the assurance of a satisfactory product. Furthermore, this softening point is lowered with an increase in the molecular weight of the alcohol radical present in the acrylic acid ester. It is essential that the resin have a considerable spread between its softening point at elevated temperatures and its brittle point at low temperatures in order that the resulting laminated glass may possess strength and flexibility under all climatic conditions. As a result of this lowered softening point, the applicability of the known aliphatic ester resins of acrylic acid has been materially limited.

It has been found that the glycol esters of acrylic acid have a much higher softening point than the other esters of the crylic acid group and also that their softening point may be raised to an even higher degree by increasing the drying and heat treating temperatures up to 275 degrees F. This increased heat may be applied without danger of discoloration or destruction of the more valuable features of the resinous material. Accordingly this invention marks an important advancement in the use of acrylic acid resins in the preparation of safety glass.

In order that my invention may be more clearly understood and practiced by any one skilled in the art, the following example is given to show a preferred method of procedure although I do not wish to be limited thereby. It is evident that many variations of conditions and concentrations of reactants are permissible, all of which will result in the products desired:

Example 1

200 parts of ethylene chlorhydrin is added slowly with constant agitation to a solution of 122 parts of sodium cyanide dissolved in 75 parts of water. The rate of addition is so regulated that the temperature of the reaction mixture is maintained between 120 and 130 degrees F. This addition takes approximately two hours after which the temperature is raised to 200 degrees F. and maintained at this point for two to three hours. The mixture is then allowed to cool to room temperature at which it is held, with agitation, for eight to twelve hours.

The salt, sodium chloride, formed by the reaction is filtered off, washed with acetone and the filtrate distilled several times, the separated salt being filtered off after each distillation.

To the final filtrate is added:

| | Parts |
|---|---|
| Ethylene glycol | 154 |
| 66 degree Baumé sulfuric acid | 80 |

The sulfuric acid is added slowly to prevent excessive ebullition. After all the sulfuric acid has been added, the solution is refluxed for three to five hours and distilled. That fraction distilling between 120 to 150 degrees F. is taken as the ester.

It is probable that the reaction takes place according to the following equations:

$$CH_2OHCH_2Cl + NaCN \rightarrow CH_2OHCH_2CN + NaCl$$

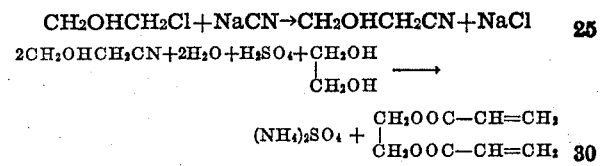

It is quite likely that a mixture of mono and di-glycol acrylates is formed by this method, the difference being:

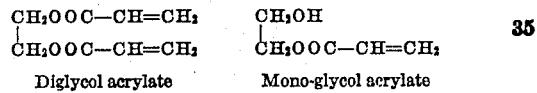

Diglycol acrylate     Mono-glycol acrylate

If it is desired to obtain either the mono or di-glycol acrylate in pure form, this mixture may be fractionated.

The ester may be polymerized by any of the known methods. The best control of polymerization is obtained in the following way:

One part of the monomeric ester is dissolved in nine parts of a mixture of equal parts by weight of ethylene chloride and methyl alcohol. To this mixture is added approximately one-half of one per cent of benzoyl peroxide, and the whole gently heated for two or three hours.

At the end of the reaction a viscous, clear, water-white solution is obtained. When this solution is poured on glass plates, the volatile solvents evaporated, and the plates laminated with the film sides together, an excellent shatterproof glass results. The plastic has excellent adhesion to glass. It is absolutely clear, water-white and does not discolor when exposed to actinic light. In addition, it is considerably stronger and tougher than the plastics consisting of polymerized esters of the aliphatic series of acrylic acid. Moreover, it possesses a considerably wider range between the brittle point at low temperatures and the softening point at higher temperatures. This, of course, is an important feature when the product is considered as a plastic for shatterproof glass, since it insures safety under all climatic conditions. The polymerized resinous product shows a remarkable resistance to water. This property is a decided asset inasmuch as the edges of the laminated plate will not require additional treatment in the form of an application of a sealing medium to effect a waterproof joint.

These properties are distinctive to the polymerized glycol esters of acrylic acid. Esters prepared from derivatives of ethylene glycol, such as butyl cellosolve acrylate, butyl carbitol acrylate, etc., are too soft to be used as a plastic for shatterproof glass and discolor badly when exposed to actinic rays.

It will be apparent that the invention is not limited to the glycol esters of acrylic acid mentioned in the foregoing disclosure. Thus, for example, instead of acrylic acid, homologues of this acid may be employed, such as methacrylic acid, which will yield analogous resinous products possessing the same characteristics of the glycol acrylates. Other changes and modifications may also be made without departing from the spirit of the invention.

What I claim is:

A process of manufacturing synthetic resinous materials which comprises combining ethylene chlorhydrin with a solution of sodium cyanide, heating the resultant mixture to 200° F. for approximately 3 hours, reducing the temperature of the mixture to approximately 75° F. and agitating the mixture at this reduced temperature for approximately 10 hours, distilling the mixture, treating the distillate with a mixture of ethylene glycol and sulfuric acid, distilling the solution, removing that fraction which boils from 120–150° F., and polymerizing said fraction.

ELMER H. HAUX.